3,833,675
Patented Sept. 3, 1974

3,833,675
BROMINATION OF UNSATURATED HYDROCARBONS IN MIXED SOLVENTS
Jack Newcombe, Freehold, and Anderson O. Dotson, Jr., Somerset, N.J., assignors to Cities Service Company, New York, N.Y.
No Drawing. Continuation-in-part of abandoned application Ser. No. 99,515, Dec. 18, 1970. This application July 28, 1972, Ser. No. 275,981
Int. Cl. C07c 17/02
U.S. Cl. 260—648 R                    8 Claims

ABSTRACT OF THE DISCLOSURE

In the bromination of an unsaturated hydrocarbon, such as the bromination of 1,5-cyclooctadiene to form tetrabromocyclooctane, improved product purities and yields are obtained when the reaction takes place in a mixture of solvents, such as heptane and t-butyl alcohol.

CROSS-REFERENCE TO RELATED APPLICATION

This application is a continuation-in-part of application S.N. 99,515, filed Dec. 18, 1970 and now abandoned.

BACKGROUND OF THE INVENTION

This invention relates to an improvement in the halogenation of unsaturated hydrocarbons. More particularly, it relates to an improvement in the procedures for the bromination of unsaturated acyclic and alicyclic olefins. Bromination of an unsaturated hydrocarbon, such as the bromination of 1,5-cyclooctadiene to form tetrabromocyclooctane, is known in the art. Generally, brominations of this type, done in the presence of a non-polar solvent, such as carbon tetrachloride, result in substitutive reactions, with a decreased yield and lower quality of the desired brominated product. Similar brominations, done in the presence of a polar solvent, such as ethanol, can form by-products as a result of the interaction of the polar solvent with the reagents. The prior art has thus not shown a satisfactory method of forming the brominated product in good yield and purity.

SUMMARY OF THE INVENTION

It has now been found that brominated compounds can be recovered in good yield and unusually high purity from the reaction of a brominating agent, e.g. bromine, with an aliphatic or cycloaliphatic unsaturated hydrocarbon or hydrocarbyl halide by conducting the bromination reaction in the presence of a liquid mixture of a halogen-free, polar first solvent that is substantially inert to bromine and a second hydrocarbon or hydrocarbyl halide solvent (hereinafter identified and described in detail as Class A and Class B solvents, respectively), both of which are free of aliphatic unsaturation. Improvements in yield and purity are evidenced by the narrower melting range and improved product color obtained by the use of the solvent mixture, in contrast to the results obtained by using each solvent singly.

Broadly, the alicyclic hydrocarbons and hydrocarbyl halides that can be brominated by this procedure are those that contain from about 5 to 22 or more carbon atoms and from 1 to 4 or more unsaturated carbon-carbon bonds, while the acyclic hydrocarbons and hydrocarbyl halides contain from about 4 to about 22 or more carbon atoms and from 1 to 4 or more unsaturated carbon-carbon bonds. Examples of hydrocarbyl halides that can be brominated are 9-bromocyclododecadiene-1,5, 5-chlorocyclooctene-1, 4-bromobutene-1 and 6-bromocyclodecene-1, while exemplary bicyclic hydrocarbons are 1,9-octalin and 9,10-octalin. The cyclic oligomers of butadiene, such as cyclooctadiene, vinylcyclohexene and cyclododecatriene, are the preferred unsaturated alicyclic hydrocarbons, and butadiene, hexene, low-molecular weight liquid polybutadiene and octadiene are preferred unsaturated acyclic hydrocarbons. The brominated products of this invention can be used in formulating fire retardant materials.

It is possible to brominate an unsaturated hydrocarbon by adding the bromine directly to the hydrocarbon, without solvent. However, this procedure usually results in a lower yield of the desired product. Therefore, the use of a solvent system is desirable. While bromine is the most widely used brominating agent, other agents, such as pyridine hydrobromide perbromide, can be used.

Broadly, organic solvents offer a suitable reaction medium wherein the unsaturated hydrocarbon can react with the bromine. Desirably, these organic solvents are not reactive toward the bromine or the unsaturated hydrocarbon under the conditions used in this invention. Mixtures of these liquid organic solvents should be miscible with the reacting compound and with each other. At the same time, the solvents should not have an appreciable solubility for the brominated products. Although liquid solvents are preferred, one component of the mixture can be a solid organic compound, at ambient temperature, which, when dissolved in the liquid component, forms a liquid mixture.

The liquid organic solvents used in this invention can be classified as Class A and Class B solvents.

Class A solvents are broadly characterized as halogen-free, polar, nitrogen-, oxygen- and sulfur-containing aliphatic hydrocarbons that do not have an appreciable rate of reaction with bromine at ambient temperatures and that do not contain aliphatic unsaturation. Desirably, they are miscible with the brominating agent, with the unsaturated hydrocarbon to be brominated and with the Class B solvent, and they are immiscible with the brominated product. These Class A solvents can include lower alkyl esters, ethers and nitriles, lower alkanoic acids and amides thereof, and lower alkanols and alkanthiols, as exemplified by propyl ether, ethyl butyrate, propionitrile, valeric acid, butyramide, t-butyl alcohol and hexanthiol. The especially preferred Class A solvents are aliphatic nitriles containing from 1 to about 6 carbon atoms in the non-nitrile portion of the molecule, such as acetonitrile, and saturated aliphatic alcohols containing from 2 to about 12 carbon atoms. These alcohols can be alicyclic or straight chain or branched chain acyclic alcohols and can be primary, secondary or tertiary. Exemplary alcohols are cyclohexanol, cyclooctanol, propanol-1, pentanol-2, 4-methyl-octanol-4, and 3-ethyl-heptanol-1. The preferred alcohols are the t-alkanols, such as t-butyl alcohol (2-methyl-propanol-2) and t-amyl alcohol (2-methyl-butanol-2).

Class B solvents are broadly classified as aromatic, acyclic and alicyclic hydrocarbons, and hydrocarbyl halides which are free of aliphatic unsaturation. Preferred Class B solvents include saturated acyclic hydrocarbons that contain from about 4 to about 14 carbon atoms, saturated alicyclic hydrocarbons that contain from about 5 to about 12 carbon atoms, aromatic hydrocarbons that contain from about 6 to about 12 carbon atoms and halogenated acyclic, alicyclic and aromatic hydrocarbons that are liquid at ambient temperature. Examples of these Class B solvents are pentane, octane, dodecane, cyclohexane, cyclodecane, benzene, xylene, α-methylnaphthalene, butyl bromide, octyl chloride, cyclohexyl chloride and bromobenzene. These solvents desirably have reactivity and miscibility characteristics similar to those mentioned for the Class A solvents. Especially preferred Class B solvents are the acyclic and alicyclic hydrocarbons containing from about 5 to about 7 carbon atoms, such as heptane or cyclohexane, and the halogenated acyclic hydrocarbons containing 1 or 2 carbon atoms, such as carbon tetrachloride and ethylene chloride.

The volume ratios of the solvents can vary over a reasonably wide range. The ratio of Class A to Class B solvents can range from about 5/95 to about 95/5. A more desirable ratio is one that can vary from about 20/80 to about 80/20, and many brominations can be done where the ratio can vary from about 40/60 to about 60/40.

A range of temperatures can be used for the bromination reaction. Depending on the solvent system used, the reaction temperature can vary from about −20° C. to about 58° C., the boiling point of bromine, the preferred brominating agent. Reactions carried on a higher temperature would need special equipment. A preferred range for the reaction temperature is from about 10 to about 30° C.

There should be sufficient agitation to assure good mixing of the reactants, but the agitation should not be so violent as to cause physical loss of the reactants or products.

The reaction time can vary, depending on the temperature, the ratio of solvents and the ratio of reactants to solvents. The time should be long enough to assure good yields of the desired products. The reaction time can vary from about ½ hour to about 6 hours, with a reaction time of from about 1 hour to about 3 hours being desirable.

Typically, the reaction of a brominating agent with an unsaturated hydrocarbon is exothermic and reasonably rapid. If bromine is used, the disappearance of the yellow or brown bromine color in the mixture can be taken as a measure of completion of the reaction. It has been found in the present invention that a slight excess of brominating agent during the reaction gives improved yields with less by-product formation. The rate of addition of the brominating agent, for example bromine, is thus generally as fast as the bromine can react with the ethylenic or acetylenic unsaturation, as evidenced by the disappearance of the bromine color. There are many ways by which the brominating agent, the unsaturated hydrocarbon and the solvent mixture can be combined. One embodiment is to dissolve the brominating agent in one of the solvents and to add this solution to a solution of unsaturated hydrocarbon in the other solvent. Another embodiment is to add, simultaneously, separate streams of brominating agent and unsaturated hydrocarbon to a mixture of the desired solvents. The technology of agitation and temperature control of the reaction mixture is well known.

The brominated products are, desirably, insoluble in the reaction mixture and may thus be removed from the mixture, as by filtration. The crude product can then be purified by known steps, such as washing, additional filtration, and drying.

A desirable aspect of this invention lies in the recycling of the solvent mixture. After the preferred brominated product has been removed, the solvent mixture can be used, without intermediate purification, in a subsequent bromination reaction. This multiple use of the solvent mixture enhances the simplicity and desirability of this solvent system.

DESCRIPTION OF THE PREFERRED EMBODIMENTS

The color of each brominated product in the examples was noted and numbered according to the following arbitrary color scale:

1=white
2=off-white
3=light-tan
4=tan
5=brown

EXAMPLE 1

An open 400 milliliter beaker equipped with a stirrer was charged with 100 milliliters of absolute ethanol and 0.2 mole of 1,5-cyclooctadiene. The beaker was then placed in a water bath maintained at 25° C., and 0.4 mole of bromine was added dropwise over a period of 1 hour. Almost immediately, a precipitate of the brominated hydrocarbon formed and continued to form during the reaction. After completion of the addition of bromine, 4 g. of sodium carbonate were added, the reaction mixture was stirred for an additional 1 hour and then filtered. The product filter cake was washed five times with separate 50 milliliter portions of water. The crystalline product was then dried for 20 hours in a vacuum oven at 55 to 60° C. Crystalline tetrabromocyclooctane, having a melting range of 89–110° C. and a color value of 2, was obtained in a yield of 61 mole percent. The major impurity formed was ethoxy-tribromocyclooctane, indicating some solvolytic reaction involving the ethanol.

EXAMPLE 2

The procedure of Example 1 was repeated, employing 100 milliliters of heptane in place of ethanol. Evolution of HBr was noted, indicating some substitutive bromination. The tetrabromocyclooctane obtained had a melting range of 93–108° C., a color value of 5 and a yield of 67 mole percent.

EXAMPLE 3

A clean 4-neck glass flask containing a stirrer, a thermometer and two dropping funnels was charged with 50 ml. absolute ethanol and 50 ml. heptane. While maintaining the reaction temperature at about 25° C., 0.2 mole 1,5-cyclooctadiene and 0.4 mole bromine were added, in separate streams, at such rates that the typical yellow-brown color of unreacted bromine was maintained in the stirred reaction mixture. The addition time was 1 hour. The mixture was stirred for an additional hour and then filtered. The filter cake was washed with 5 separate 100 ml. portions of 5% sodium carbonate solution and then dried. The product had a melting range of 98–110° C., a color value of 2 and a yield of 63 mole percent, indicating that the use of a solvent mixture resulted in a product having a higher purity than when either solvent was used separately.

EXAMPLE 4

This example illustrates the use of various solvent mixtures in the bromination of an unsaturated hydrocarbon, as shown in Table 1. When a single solvent was used, the procedure of Example 1 was followed, and when a solvent mixture was used, the procedure of Example 3 was followed. In each case, the reactants were 0.2 mole 1,5-cyclooctadiene and 0.4 mole bromine. The total solvent volume was 100 ml., and the reaction temperature was 25° C. The mole percent yields were based on the weight of tetrabromocyclooctane obtained.

The columns headed by "Cycle 1" show the product results of the first bromination. In most examples the recovered solvent, after removal of the brominated product, was retained and used for a second bromination cycle. The procedure for Cycle 2 was the same as for Cycle 1, after the solvent volume had been restored to 100 ml. by the addition of fresh solvent. The product results for Cycle 2 indicate that recycle use of the solvent gives an acceptable product.

TABLE 1

|  | Solvent composition | | Cycle 1 | | | Cycle 2 | | |
|---|---|---|---|---|---|---|---|---|
|  | | | Yield (mole) percent | Melting range, °C. | Color | Yield (mole) percent | Melting range, °C. | Color |
| (A) | Ethanol/Heptane | | | | | | | |
|  | 100 | 0 | 61 | 89–100 | 2 | 86 | 61–87 | 3 |
|  | 70 | 30 | 62 | 98–110 | 2 | 73 | 88–105 | 3 |
|  | 50 | 50 | 63 | 98–110 | 2 | 69 | 94–109 | 2 |
|  | 30 | 70 | 63 | 99–110 | 3 | 87 | 90–104 | 4 |
|  | 15 | 85 | 60 | 106–108 | 2 | 78 | 82–109 | 4 |
|  | 0 | 100 | a 67 | 93–108 | 5 | No recycle | | |
| (B) | Ethanol/Benzene | | | | | | | |
|  | 100 | 0 | 61 | 89–110 | 2 | 86 | 61–87 | 3 |
|  | 85 | 15 | 65 | 89–103 | 2 | 81 | 58–94 | 3 |
|  | 70 | 30 | 69 | 97–108 | 3 | 102 | 65–104 | 4 |
| (C) | Isopropyl alcohol/Cyclohexane | | | | | | | |
|  | 100 | 0 | 64 | 88–103 | 2 | | 49–95 | 3 |
|  | 50 | 50 | 71 | 96–108 | 2 | 97 | 62–96 | 2 |
|  | 0 | 100 | a 52 | 79–104 | 5 | 47 | 80–101 | 5 |
| (D) | t-Butyl alcohol/Heptane | | | | | | | |
|  | 100 | 0 | 79 | 90–105 | 2 | 84 | 78–104 | 2 |
|  | 75 | 25 | 75 | 98–110 | 1 | 82 | 91–110 | 2 |
|  | 75 | 25 | 74 | 99–110 | 1 | No recycle | | |
|  | 50 | 50 | 74 | 100–110 | 1 | 82 | 90–106 | 2 |
|  | 25 | 75 | 76 | 100–110 | 2 | 78 | 93–110 | 2 |
|  | 0 | 100 | a 67 | 93–108 | 5 | No recycle | | |
| (E) | t-Butyl alcohol/Cyclohexane | | | | | | | |
|  | 100 | 0 | 79 | 90–105 | 2 | 84 | 78–104 | 2 |
|  | 50 | 50 | 79 | 94–106 | 1 | 88 | 87–105 | 2 |
|  | 0 | 100 | 52 | 79–104 | 5 | 47 | 80–101 | 5 |
| (F) | t-Butyl alcohol/Carbon tetrachloride | | | | | | | |
|  | 100 | 0 | 79 | 90–105 | 2 | 84 | 78–104 | 2 |
|  | 25 | 75 | 70 | 98–109 | 2 | 80 | 91–105 | 2 |
|  | 10 | 90 | 73 | 93–108 | 2 | 71 | 94–105 | 3 |
|  | 0 | 100 | a 38 | 77–106 | 4 | No recycle | | | a HBr evolved during reaction.
b HBr evolving during reaction.

EXAMPLE 5

This example illustrates the value of recycling the solvent mixture and is applied to a 25-fold scale-up as compared with Example 4. The procedure of Example 3 was followed, using 5.0 moles 1,5-cyclooctadiene, 10.5 moles bromine, 1000 ml. tertiary butyl alcohol and 1000 ml. heptane. After the brominated product of cycle 1 was removed from the reaction mixture, the reaction was repeated using the filtrate from cycle 1 as the solvent mixture. The results are shown below.

Cycle 1

Yield (mole percent) _____ 75.3
Melting range (° C.) _____ 95–104
Color _____ 1

Cycle 2

Yield (mole percent) _____ 85.8
Melting range (° C.) _____ 91–103
Color _____ 1

EXAMPLE 6

Using the procedure of Example 3, 45 g. of liquid polybutadiene (65% vinyl unsaturation, vinyl/trans ratio=1.85, intrinsic viscosity (benzene, 30° C.)=0.095 dl./g., 1.373 moles $I_2$ unsaturation per 100 g. liquid polymer or 72.8 g. polymer per mole unsaturation) was brominated with 120 g. bromine, using a mixture of 75 ml. t-butyl alcohol and 225 ml. heptane. The brominated polybutadiene product was prepared in 97.6 weight percent yield, the bromine content of the product was 68.6% and the color rating was 3.

EXAMPLE 7

Using the procedure of Example 3, 0.5 mole 4-vinylcyclohexene was brominated with 1.075 mole bromine, using 100 ml. t-butyl alcohol and 100 ml. heptane. A 90 mole percent yield of 4 - (1,2 - dibromoethyl) - 1,2 - dibromocyclohexane, having a melting range 62–74° C. and a color rating of 1, was obtained. The bromine content of the product was 73.9%; calculated bromine content=74.7%.

EXAMPLE 8

A new composition of matter, pentabromocyclododecane, useful as a flame retardant compound when incorporated with a normally flammable polymer, was prepared by bromination of monobromocyclododecadiene. Monobromocyclododecadiene had been previously prepared by hydrobromination of cyclododecatriene. Using the procedure of Example 3, 0.2 mole monobromocyclododecadiene and 0.42 mole bromine were simultaneously added to a solvent mixture of 50 ml. each of t-butyl alcohol, heptane and benzene. A 52 weight percent yield of light tan solid was obtained, melting range=65–100° C. Recrystallization from a 50–50 acetone-ethanol mixture gave a white crystalline solid with a melting range of 150–155° C. The bromine content of the product was 70.53% (theoretical=70.99%).

EXAMPLE 9

A new composition of matter, hexabromotrimethylcyclododecane, useful as a flame retardant compound in a polymeric composition, was prepared by bromination of trimethyl-cyclododecatriene, using the procedure of Example 3. To a mixture of 45 ml. heptane, 45 ml. t-butyl alcohol and 50 ml. benzene were added, in simultaneous streams, 0.58 mole (92.7 g.) bromine and 0.15 mole (31.15 g. of 98.4% assay) trimethylcyclododecatriene. The liquid product which separated from the solvent solidified after three days, giving a tan solid. On recrystallization from acetone, a dark syrup separated from the acetone but did not crystallize. The 102 g. of syrupy product represented a 99.4 weight percent yield, calculated as hexabromotrimethylcyclododecane.

EXAMPLE 10

Bromination of cyclododecatriene

A—Using a Single Solvent

1. Using the procedure of Example 1, 0.33 mole of cyclododecatriene (95% trans,trans,cis-isomer, 3% trans, trans,trans, and about 2% others was mixed with 305 ml. 95% ethanol. The temperature of the stirred mixture was maintained at 20-30° C. while 1.075 mole of $Br_2$ was added dropwise over a 2.5 hour period. The hexabromocyclododecane product, obtained in 68% yield, had a melting range of 160-179° C.

2. Repeating the procedure of (1) above only using 300 ml. of methylene chloride ($CH_2Cl_2$) as the solvent, the expected product was obtained in 39% yield and had a melting range of 143-157° C.

3. Repeating the procedure of (2) above only using 300 ml. of glacial acetic acid solvent, the product was obtained in 43% yield and had a melting range of 129-192° C.

B—Using Mixed Solvents

1. Using the procedure of Example 3, 0.5 mole of cyclododecatriene and 1.63 moles bromine were added to 250 ml. of a 63.4/36.6 vol. ratio of benzene and t-butyl alcohol. The addition time was 1.5 hours, the reaction temperature was 25° C. and the mixture was stirred for 1.5 hours after addition was complete. The white, crystalline product, filtered and washed 5 times with solvent of the same composition as that used in the reaction, was recovered in 42% yield and had a melting range of 198-200° C.

When the filtrate from this reaction was used in a subsequent run, as discussed previously, the yield of hexabromocyclododecane was 55%.

Repeating the above experiment with variations in concentrations, temperatures and ratios of solvents, as described previously, white, crystalline products can be obtained which melt above between about 195° C. and up to about 210° C. These materials are outstanding fire retarding agents and can be readily processed in polymers under conventional conditions.

While the present invention has been described herein with reference to particular embodiments thereof, it will be appreciated by those skilled in the art that various changes and modifications can be made without departing from the scope of the invention as set forth.

We claim:
1. Method for brominating an unsaturated cycloaliphatic hydrocarbon or hydrocarbyl halide containing about 5-22 carbon atoms and about 1-4 carbon-carbon double bonds or an unsaturated acyclic hydrocarbon or hydrocarbyl halide containing about 4-22 carbon atoms and about 1-4 carbon-carbon double bonds, comprising conducting the bromination reaction by using a brominating agent selected from bromine and pyridine hydrobromide perbromide in the presence of a liquid mixture of
  (a) a saturated, halogen-free, polar first organic solvent, substantially inert to bromine, selected from the group consisting of lower alkyl esters, ethers and nitriles, lower alkanoic acids and amides, and lower alkanols and alkanthiols, and mixtures thereof and
  (b) a hydrocarbon second organic solvent substantially inert to bromine, and selected from the group consisting of
     1. saturated acyclic hydrocarbons containing from about 4 to about 14 carbon atoms,
     2. saturated alicyclic hydrocarbon containing from about 5 to about 12 carbon atoms,
     3. aromatic hydrocarbons containing about 6 to about 12 carbon atoms, and
     4. mixtures thereof
wherein the volume ratio of said first and second solvents is from about 20:80 to about 80:20.

2. Method of Claim 1 wherein said first solvent is an aliphatic nitrile containing from about 1 to about 6 carbon atoms in the non-nitrile portion or a saturated aliphatic alcohol containing from 2 to about 12 carbon atoms.

3. Method of Claim 2 wherein said first solvent is a tertiary lower alcohol.

4. Method of Claim 1 wherein said second solvent is a hydrocarbon having from about 5 to about 7 carbon atoms.

5. Method of Claim 1 wherein said liquid mixture of solvents is separated from the insoluble bromination reaction product and reused as the solvent mixture in a subsequent bromination reaction.

6. Method of Claim 1 wherein said first solvent is a tertiary lower alkanol and said second solvent is a hydrocarbon having from about 5 to about 7 carbon atoms.

7. Method of Claim 6 wherein said first solvent is t-butanol, said second solvent is benzene and said unsaturated hydrocarbon is cyclododecatriene.

8. Method of claim 1 in which the reaction temperature varies from about 10° to about 30° C.

References Cited

UNITED STATES PATENTS

| | | | |
|---|---|---|---|
| 3,318,945 | 5/1967 | Erman | 260—648 R |
| 3,544,641 | 12/1070 | Versnel | 260—648 R |
| 3,558,727 | 1/1971 | Jenkner et al. | 260—648 R |
| 3,716,591 | 2/1973 | Brady | 260—648 R |

OTHER REFERENCES

Takahashi, Chemical Abstracts, 67 53755q (1967).

DANIEL D. HORWITZ, Primary Examiner

U.S. Cl. X.R.

260—658 R, 659 R, 660 R

UNITED STATES PATENT OFFICE
CERTIFICATE OF CORRECTION

Page 1

Patent No. 3,833,675　　　Dated September 3, 1974

Inventor(s) Jack Newcombe et al.

It is certified that error appears in the above-identified patent and that said Letters Patent are hereby corrected as shown below:

Table 1, "A to E" should read as shown attached.

Under Table 1, delete "bHBr evolving during reaction."

Signed and sealed this 17th day of December 1974.

(SEAL)
Attest:

McCOY M. GIBSON JR.
Attesting Officer

C. MARSHALL DANN
Commissioner of Patents

TABLE 1

| Solvent Composition | Cycle 1 Yield (mole)% | Cycle 1 Melting Range °C | Cycle 1 Color | Cycle 2 Yield (mole)% | Cycle 2 Melting Range °C | Cycle 2 Color |
|---|---|---|---|---|---|---|
| (A) Ethanol/Heptane | | | | | | |
| 100 / 0 | 61 | 89-110 | 2 | 86 | 61-87 | 3 |
| 70 / 30 | 62 | 98-110 | 2 | 73 | 88-105 | 3 |
| 50 / 50 | 63 | 98-110 | 2 | 69 | 94-109 | 2 |
| 30 / 70 | 63 | 99-110 | 3 | 87 | 90-104 | 4 |
| 15 / 85 | 60 | 106-108 | 2 | 78 | 82-109 | 4 |
| 0 / 100 | 67 (a) | 93-108 | 5 | No Recycle | | |
| (B) Ethanol/Benzene | | | | | | |
| 100 / 0 | 61 | 89-110 | 2 | 86 | 61-87 | 3 |
| 85 / 15 | 65 | 89-103 | 2 | 81 | 58-94 | 3 |
| 70 / 30 | 69 | 97-108 | 3 | 102 | 65-104 | 4 |
| (C) Isopropyl Alcohol/Cyclohexane | | | | | | |
| 100 / 0 | 64 | 88-103 | 2 | 86 | 49-95 | 3 |
| 50 / 50 | 71 | 96-108 | 2 | 97 | 62-96 | 2 |
| 0 / 100 | 52 (a) | 79-104 | 5 | 47 | 80-101 | 5 |
| (D) t-Butyl Alcohol/Heptane | | | | | | |
| 100 / 0 | 79 | 90-105 | 2 | 84 | 78-104 | 2 |
| 75 / 25 | 75 | 98-110 | 1 | 82 | 91-110 | 2 |
| 75 / 25 | 74 | 99-110 | 1 | No Recycle | | |
| 50 / 50 | 74 | 100-110 | 1 | 82 | 90-106 | 2 |
| 25 / 75 | 76 | 100-110 | 2 | 78 | 93-110 | 2 |
| 0 / 100 | 67 (a) | 93-108 | 5 | No Recycle | | |
| (E) t-Butyl Alcohol/Cyclohexane | | | | | | |
| 100 / 0 | 79 | 90-105 | 2 | 84 | 78-104 | 2 |
| 50 / 50 | 79 (a) | 94-106 | 1 | 88 | 87-105 | 2 |
| 0 / 100 | 52 (a) | 79-104 | 5 | 47 | 80-101 | 5 |